(No Model.)

D. M. PARRY.
CUT-OFF FOR PLANTERS.

No. 347,637. Patented Aug. 17, 1886.

WITNESSES.
Chas N. Leonard.
E. W. Bradford.

INVENTOR.
David M. Parry,
PER
C. Bradford.
ATTORNEY.

UNITED STATES PATENT OFFICE.

DAVID M. PARRY, OF RUSHVILLE, INDIANA.

CUT-OFF FOR PLANTERS.

SPECIFICATION forming part of Letters Patent No. 347,637, dated August 17, 1886.

Application filed November 16, 1885. Serial No. 182,929. (No model.)

*To all whom it may concern:*

Be it known that I, DAVID M. PARRY, of the city of Rushville, county of Rush, and State of Indiana, have invented certain new and useful Improvements in Cut-Offs for Planters, of which the following is a specification.

The object of my present invention is to provide a "cut-off" for the feeding mechanism of that class of planters designed especially for the planting of cotton or like seed, which shall not only efficiently cut off the flow of seed during the intervals between the passage of the fingers of the force feeding device, but shall also operate to separate said seed as it is forced through it, and thus permit them to drop singly, instead of in a wad or bunch, thereby overcoming this well-known disadvantage of other planters, as will be hereinafter more particularly described.

Figure 1:
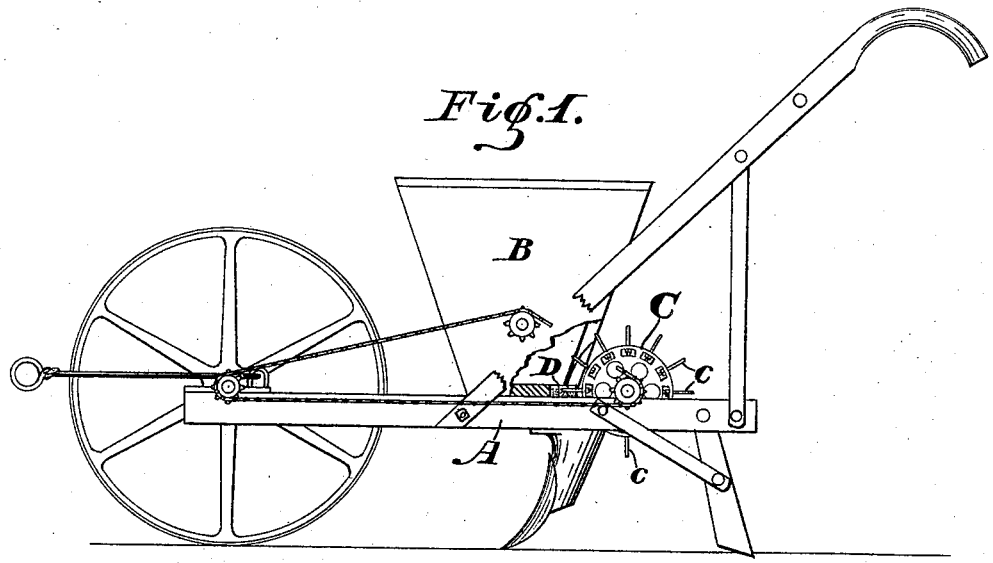
Figure 2:
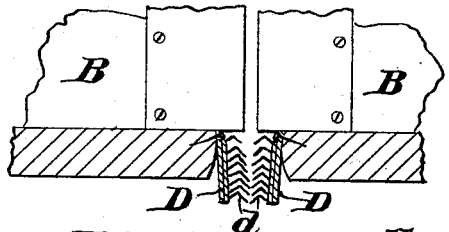
Figure 3:
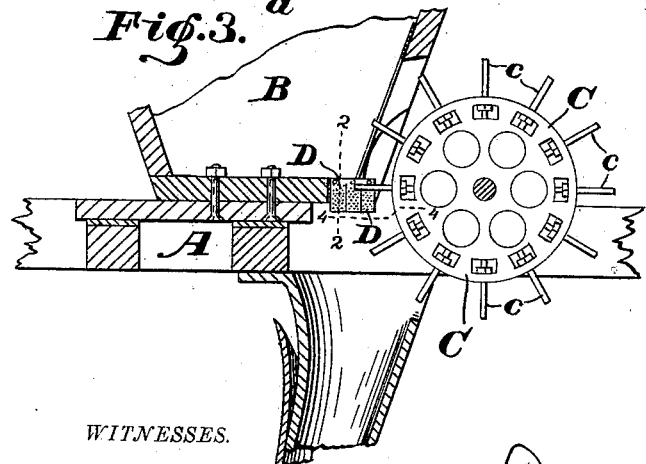
Figure 4:
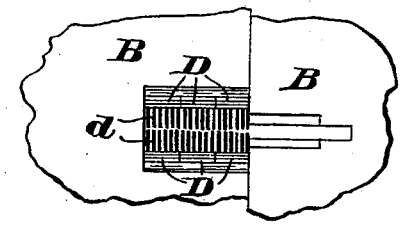
Figure 5:
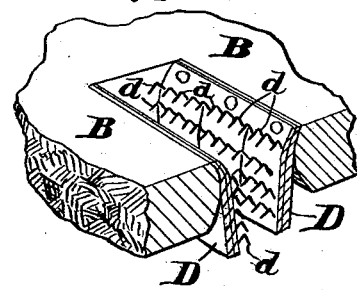

Referring to the accompanying drawings, which are made a part hereof, and on which similar letters of reference indicate similar parts, Figure 1 is a side elevation of a planter embodying my said invention, one corner of the hopper being broken out to show the position of the cut-off more clearly; Fig. 2, a cross-section through the cut-off and adjacent parts on the dotted line 2 2; Fig. 3, a longitudinal vertical section similar to a portion of Fig. 1, on an enlarged scale; Fig. 4, a detail under side plan view of the cut-off, and Fig. 5 a perspective view of the same.

In said drawings, the portions marked A represent the frame-work; B, the hopper; C, feeding mechanism, and D the cut-off.

The planter shown is in all particulars, with the exception of the cut-off, of the construction shown and described in Letters Patent No. 325,763, granted me on the 8th day of September, 1885, the hopper being longitudinally adjustable, as therein. These parts will not, therefore, be described herein, except incidentally, in the description of the cut off to which this invention is confined.

The cut-off D consists of a series of flexible fingers provided with outwardly-projecting teeth *d* on their faces, secured on each side of the slot or opening in the bottom of the hopper, said teeth projecting from each side to or nearly to the center of said opening, and thus closing it and preventing any seed from escaping, except when forced through by the force feeding device. The edges of said opening, to which said flexible fingers are secured, are preferably formed rounded, as shown, and thus the lower ends of said fingers are held toward each other by the center of said edge, while they are at the same time permitted to be forced back under said center to permit the seed to escape. Said fingers are preferably formed of heavy leather, it being cheap, suitable, and the teeth being easily mounted thereon; but they may of course be formed from any flexible material which is suitable without departing from my invention.

The operation of my invention is as follows: The seed being in the hopper and the planter being put in operation, the fingers *c* of the force feeding device pass down through the opening in the hopper between the sets of fingers, forcing a quantity of seed down through them, the teeth thereon operating to separate said seed as it is forced down between and among them, and causing said seed to fall singly, instead of in a wad or bunch. The force-finger having passed through the fingers spring back in position and cut off any further flow of seed until the next force-finger passes through.

I am aware that cut-offs for planters have heretofore been made consisting of a series of fingers extending across the opening in the hopper. I therefore do not wish to be understood as claiming the fingers, broadly; but I do claim, broadly, the construction herein shown and described, consisting of parts provided with teeth on their faces and secured at the edge of the opening in the hopper.

Having thus fully described my said invention, what I claim as new, and desire to secure by Letters Patent, is—

1. A cut-off for planters, consisting of flexible parts having teeth mounted upon their faces, said parts being secured to the edges of the opening in the hopper, with said teeth projecting toward the center thereof, substantially as set forth.

2. A cut-off for planters, consisting of flexible parts secured to the edges of the opening in the hopper, said parts having teeth mounted thereon, and said edges being formed rounded, substantially as described, and for the purposes specified.

3. A cut-off for planters, consisting of a series of flexible fingers secured to the edges of the opening in the hopper, said fingers having outwardly-projecting teeth thereon, substantially as set forth.

In witness whereof I have hereunto set my hand and seal, at Rushville, Indiana, this 13th day of November, A. D. 1885.

DAVID M. PARRY. [L. S.]

In presence of—
WM. J. HENLEY,
BEN L. SMITH.